UNITED STATES PATENT OFFICE.

JOHN L. KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

MANUFACTURE OF CEREAL FOOD.

1,189,134.     Specification of Letters Patent.     Patented June 27, 1916.

No Drawing.     Application filed December 23, 1915. Serial No. 68,316.

*To all whom it may concern:*

Be it known that I, JOHN L. KELLOGG, a citizen of the United States, residing in Battle Creek, in the county of Calhoun and State of Michigan, have invented a new and useful Improvement in the Manufacture of Cereal Food, of which the following is a specification.

My invention relates to the manufacture of cooked food products from cereals, such as rice, wheat, corn, barley and rye, with or without additional flavoring material.

The primary object of my invention is to produce a cereal food from different cereals so combined and prepared that the various healthful and beneficial elements necessary for the human system are contributed by the different ingredients in a form easily and conveniently prepared for consumption, readily assimilable, nourishing, healthful, appetizing and palatable.

To this end my invention consists primarily of the product and process hereinafter claimed, the preferred form of the product and the preferred method of making the same being first set forth in detail.

In making one form of my improved product by the method at present preferred by me, I blend together the cereal grains selected, for example rice and wheat grains, in any desired proportions according to the character of product desired.

A mixture of rice and wheat is a very desirable combination, because wheat contains some of the mineral salts and fibrous materials, which rice lacks, and which are very necessary for the human system. The mixture of, in this example, wheat and rice grains is then reduced in size or ground into a coarse meal, to which flavoring material, such as sugar, salt or malt extracts may be added to give any desired flavor. Water is then added to the comminuted grains, and after it is absorbed thereby, the grains are placed in steam ovens or retorts and allowed to cook from about thirty minutes to one hour at any suitable steam pressure, preferably about fifteen pounds. The grains may also be cooked as well in a rotary steam cooker. After the grains have been cooked they are then dried preferably by blowing hot air up through them and when partially dried are allowed to stand until they are cool. The product is then flaked by ordinary flaking rolls, in which condition it is ready for the market.

The grains being ground fine are blended together during the cooking and drying process and are thus closely intermingled. During the flaking process these grains are squeezed out into flakes, in each of which the different grains are combined more or less in the proper proportions.

The product is easily soluble in water and being cooked requires very little if any more cooking, it being necessary only to place it in a dish of boiling water and allow it to come to a boil, when the product is ready to serve.

The product makes a delicious dish, which is, as before stated, very nutritious, properly balanced, healthful, appetizing and palatable.

Different grains are selected and combined as and according to the sustaining elements desired in the final product, and the selection, composition and proportions may be thus greatly varied within the spirit and scope of my invention.

I claim as my invention:

1. A process of preparing a cereal food, during the performance of which different grains containing respectively different beneficial elements are mixed together and comminuted, and the mixture of comminuted grains moistened, cooked, dried and reduced to thin pieces.

2. A process of preparing a cereal food during the performance of which different grains containing respectively different beneficial elements are mixed together and comminuted, and the mixture of comminuted grains moistened, cooked, dried and flaked.

3. A cereal food consisting of cooked flakes individual ones of which contain the different beneficial elements of a plurality of different cereal grains.

4. A cereal food consisting of cooked flakes individual ones of which contain the beneficial elements of both wheat and rice.

JOHN L. KELLOGG.